(12) United States Patent
Taylor

(10) Patent No.: US 9,062,168 B2
(45) Date of Patent: Jun. 23, 2015

(54) METHOD FOR FILLING CONCRETE BLOCK CAVITIES WITH EXPANDING FOAM INSULATION

(71) Applicant: Fomo Products, Inc., Norton, OH (US)

(72) Inventor: Anthony J. Taylor, Medina, OH (US)

(73) Assignee: Fomo Products, Inc., Norton, OH (US)

( * ) Notice: Subject to any disclaimer, the term of this patent is extended or adjusted under 35 U.S.C. 154(b) by 297 days.

(21) Appl. No.: 13/646,785

(22) Filed: Oct. 8, 2012

(65) Prior Publication Data

US 2014/0100299 A1    Apr. 10, 2014

(51) Int. Cl.
| | |
|---|---|
| *C08G 18/48* | (2006.01) |
| *C08J 9/14* | (2006.01) |
| *C08G 18/40* | (2006.01) |
| *E04B 1/76* | (2006.01) |
| *E04B 2/02* | (2006.01) |
| *C08G 101/00* | (2006.01) |

(52) U.S. Cl.
CPC ............... *C08J 9/144* (2013.01); *C08J 9/146* (2013.01); *C08J 2201/022* (2013.01); *C08J 2203/142* (2013.01); *C08J 2203/162* (2013.01); *C08J 2203/18* (2013.01); *C08J 2375/04* (2013.01); *E04B 1/7604* (2013.01); *E04B 2002/0293* (2013.01); *C08G 18/4018* (2013.01); *C08G 18/482* (2013.01); *C08G 2101/0025* (2013.01); *C08G 2105/02* (2013.01)

(58) Field of Classification Search
CPC ............. C08G 18/4018; C08G 18/482; C08G 2101/0025; C08G 2105/02; C08J 2201/022; C08J 2203/142; C08J 2203/162; C08J 2203/18; C08J 2375/04; C08J 9/144; C08J 9/146; E04B 1/7604; E04B 2002/0293
USPC .......................................... 521/130, 167, 174
See application file for complete search history.

(56) References Cited

U.S. PATENT DOCUMENTS

| | | | | |
|---|---|---|---|---|
| 6,534,556 | B2 * | 3/2003 | Lacarte et al. | 521/174 |
| 7,705,063 | B2 * | 4/2010 | Janzen et al. | 521/114 |
| 8,680,168 | B2 * | 3/2014 | Fishback et al. | 521/56 |
| 2005/0043423 | A1 * | 2/2005 | Schmidt et al. | 521/155 |

* cited by examiner

*Primary Examiner* — John Cooney
(74) *Attorney, Agent, or Firm* — Hahn Loeser & Parks LLP

(57) ABSTRACT

The invention described herein generally pertains to the use of low boiling point, low vapor pressure blowing agents with froth polyurethane or polyisocyanurate foams to achieve superior cavity filling than when using conventional higher vapor pressure or more ozone-depleting blowing agents.

28 Claims, 6 Drawing Sheets

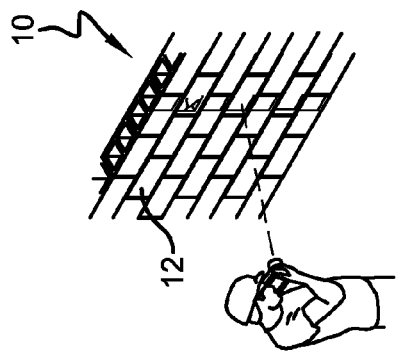
FIG. 4A
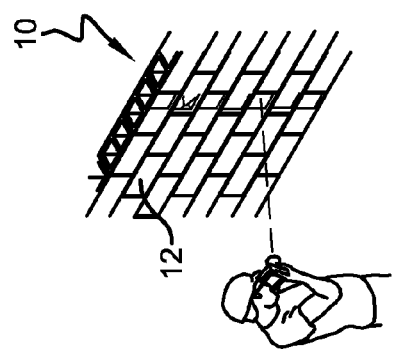
FIG. 4B
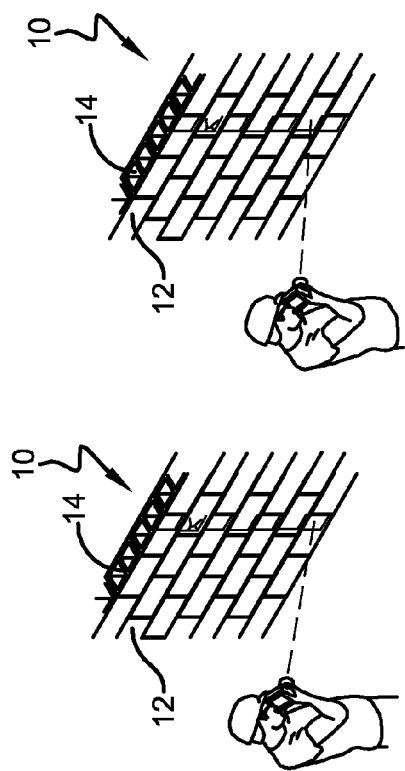
FIG. 4C
FIG. 4D
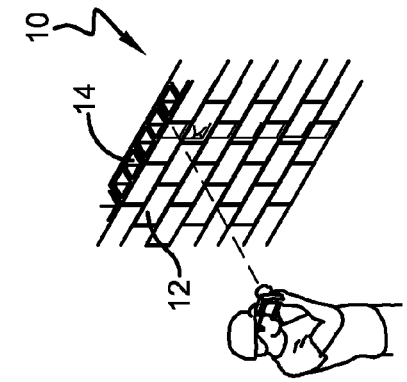
FIG. 4E
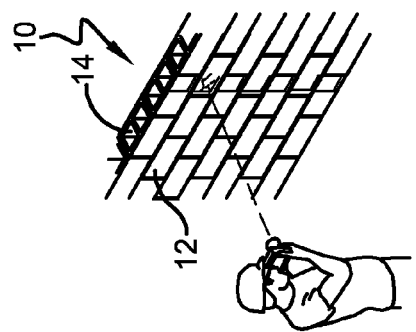
FIG. 4F
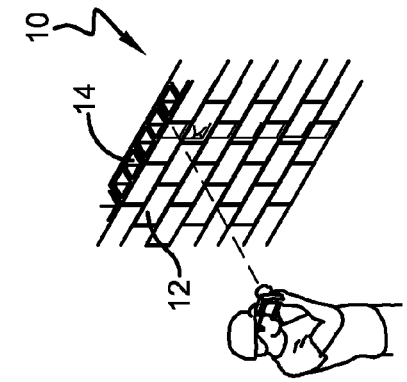
FIG. 4G

METHOD FOR FILLING CONCRETE BLOCK CAVITIES WITH EXPANDING FOAM INSULATION

TECHNICAL FIELD

The invention described herein pertains generally to a method for employing polymeric foams, in new or retrofit applications, to add insulation value to exterior concrete block walls, and associated compositions of the foam thereof.

BACKGROUND OF THE INVENTION

In today's energy conservation conscious world, finding ways to better insulate our homes, is foremost on the minds of a great many people. Many different materials have been used for such insulation. For example, fiberglass insulation provides good insulation characteristics for insulation of walls, ceilings, etc. of homes. However, a large number of homes have submerged or at least partially submerged bottom floors or cellars. The walls of this area of the home are typically fabricated from cinder block, equivalently concrete block, with essentially no insulation.

Polyurethane and polyisocyanurate foams are well-known as effective insulation materials. However, using such prior polyurethane or polyisocyanurate foams to retrofit block wall cavities with insulation has met with certain difficulties. First, the polyurethane or polyisocyanurate insulating foams have been too dense to make them economical as insulation for wall cavities. Moreover, the prior polyurethane or polyisocyanurate foams used to retrofit wall cavities with insulation have had other problems because they have rise times which greatly exceed their gel or set times. Thus, such a foam first sets within the wall cavity to such an extent that the pressure generated within the cavity causes damage as the foam completes its expansion.

Therefore, it is easily seen that what is needed is a way to dispense foam into cavities in which foam rise times are matched to gel or set times as well as control of the final foam characteristics, i.e., closed cell foam.

SUMMARY OF THE INVENTION

In accordance with the present invention, there is provided a frothable foam which upon expansion, flows around obstructions, preferably with only employing one drill hole per cavity, recognizing that certain applications with unique geometries and/or obstructions may require additional holes.

It is yet another aspect of the invention to provide a foam of reasonably uniform density within the cavity, from top to bottom.

The above and other aspects of the invention are achieved by using low pressure, high boiling point blowing agents, either neat or as a miscible blend or azeotrope with other blowing agents, recognizing that the invention encompasses future blowing agents having characteristics defined herein, particularly higher boiling points.

In broad terms, the invention describes a process for filling a cavity with a frothable polyurethane or a polyisocyanurate foam system, the process comprising the step of:
adding a two-component polyurethane or polyisocyanurate foam to said cavity, said foam comprising an effective amount of at least one blowing agent and miscible blends and azeotropes thereof, said blowing agent comprising formula (I):

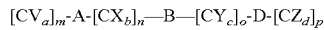

wherein
C is a carbon atom;
V, X, Y and Z are independently selected from the group consisting of H, F and Cl, therefore, as used above, permissible moieties for the first component of the Markush formula above, namely $[CV_a]$ could be $CF_3—$, $CHF_2—$, $CH_2F—$, $CCl_3—$, $CHCl_2—$, $CH_2Cl—$, $CH_3—$, $CHClF—$, $CCl_2F—$, $CF_2Cl—$, $CH\!=\!$, $C\!\equiv\!$, $CF\!=\!$, $CCl\!=\!$, etc.;
a & d are independently selected from the integral values ranging from 0 to 3 inclusive;
b & c are independently selected from the integral values ranging from 0 to 2 inclusive;
o, p & n are equal to 1;
m is selected from the integral values ranging from 0 to 1 inclusive;
A, B and D are covalent bonds sufficient to satisfy the available bonding sites of adjacent carbon atoms, if such carbon atoms are present;
said blowing agent having a boiling point between approximately 5-50° C., and an ozone depletion potential of not greater than 0.05;
said foam system having a reaction profile gel and tack time which is less than approximately 90 seconds.

In Formula (I), the covalent bonds A, B and D are independently selected from the group consisting of single, double and triple covalent bonds. The blowing agents for which Formula (I) is depicting a Markush formula, are selected from the group consisting of HFC-245fa, HFC-365mfc, HBA-2, FEA-1100, AFA-L1, AFA-L2, miscible blends and azeotropes thereof and further wherein formula (I) is a major amount of said blowing agent.

The blowing agent has preferably has a boiling point between approximately 10-40° C. When using the process and blowing agents described, the reaction profile gel and tack time is less than approximately 60 seconds, more preferably less than approximately 45 seconds. Flame retardancy is enhanced by the use of a halogenated aromatic polyol, preferably in combination with a sucrose polyether polyol with a functionality of at least 4, most preferably in combination with different catalysts. The vapor pressure of the at least one blowing agent is approximately 5 to 30 psig at 75° F. (equivalently 24° C.).

The invention and blowing agents applicable therein are not limited to 3-4 carbon moieties, but are capable of being 4-6 carbon moieties as illustrated below in Formula (II),

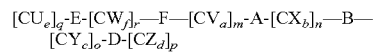

wherein
C is a carbon atom;
U, W, V, X, Y and Z are independently selected from the group consisting of H, F and Cl, placing similar constructs on the Markush formula components as illustrated with Formula (I);
d & e are independently selected from the integral values ranging from 0 to 3 inclusive;
a, b, c & f are independently selected from the integral values ranging from 0 to 2 inclusive;
o, p & n are equal to 1;
m, q & r are independently selected from the integral values ranging from 0 to 1 inclusive;
A, B, D, E and F are covalent bonds sufficient to satisfy the available bonding sites of adjacent carbon atoms, if such carbon atoms are present;

said blowing agent having a boiling point between approximately 5-50° C., and an ozone depletion potential of not greater than 0.05;

said foam system having a reaction profile gel and tack time which is less than approximately 90 seconds;

said blowing agent being non-flammable.

In a manner similar to that described previously, the covalent bonds A, B, D, E and F are independently selected from the group consisting of single, double and triple covalent bonds. Illustrative examples of blowing agents falling within Formula (II) include HFC-245fa, HBA-2, FEA-1100, AFA-L1, AFA-L2, miscible blends and azeotropes thereof and further wherein formula (II) is a major amount of said blowing agent. The blowing agent has a boiling point between approximately 10-40° C. and the polymer system will have a reaction profile gel and tack time which is less than approximately 90 seconds, more preferably less than approximately 60 seconds, most preferably less than approximately 45 seconds. In the process, the polyol side of the formulation will include a halogenated aromatic polyol, preferably in combination with a sucrose polyether polyol with a functionality of at least 4, and further in combination with different catalysts. The vapor pressure of the blowing agent will preferentially fall within the range of approximately 5 to 30 psig at 75° F. (24° C.).

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIGS. 4A through 4G are views similar to FIGS. 1-3 illustrating a user monitoring the reaction exotherm to detect obstructions within the wall cavities within an infrared camera illustrating the monitoring of the exotherm from the bottom of the cavity to the top;

DETAILED DESCRIPTION OF THE INVENTION

The best mode for carrying out the invention will now be described for the purposes of illustrating the best mode known to the applicant at the time of the filing of this patent application. The examples and figures are illustrative only and not meant to limit the invention, which is measured by the scope and spirit of the claims.

The invention relates to improved polyurethane and polyisocyanurate foams, which employ at least an effective amount of a low pressure, higher boiling point blowing agent(s) including miscible blends thereof.

Figure 1:
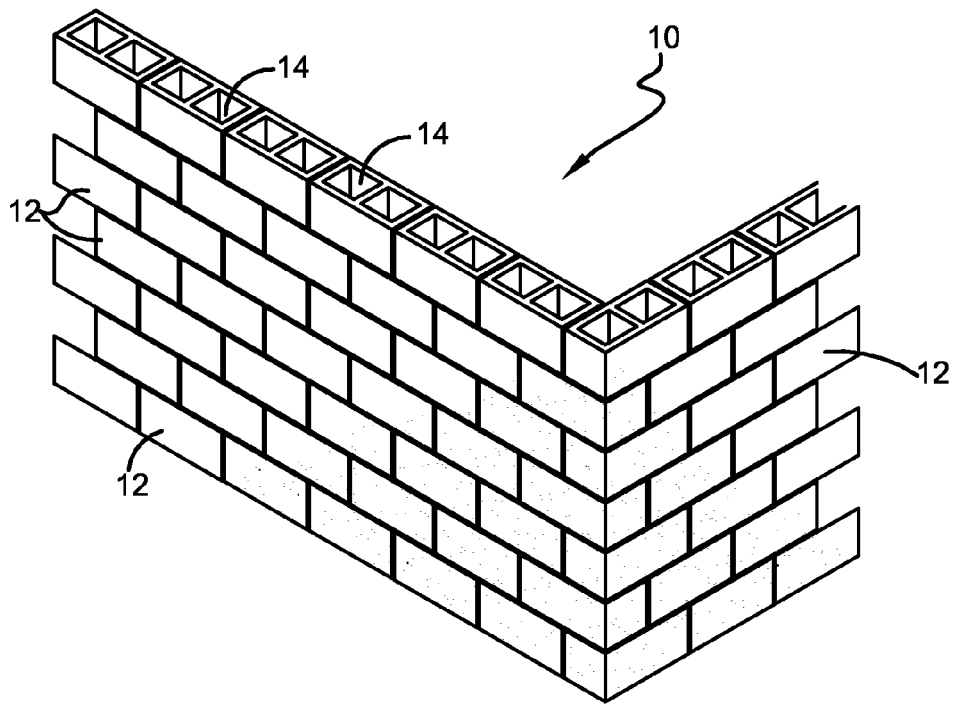
FIG. 1 is a perspective view of a cement block wall, each block offset from its underlying block by one cavity.

As illustrated in FIG. 1, the invention encompasses filling vertical cavities contained within cement block with polyurethane and/or polyisocyanurate foam with an effective amount of a low pressure, higher boiling point blowing agent(s) including miscible blends thereof. Cement block walls 10 typically comprise multiple courses of block, each block 12 having two cavities 14 disposed therein, each course typically offset by one cavity from the previous course. Grout is typically applied between each block to secure its position within the wall.

Figure 2:
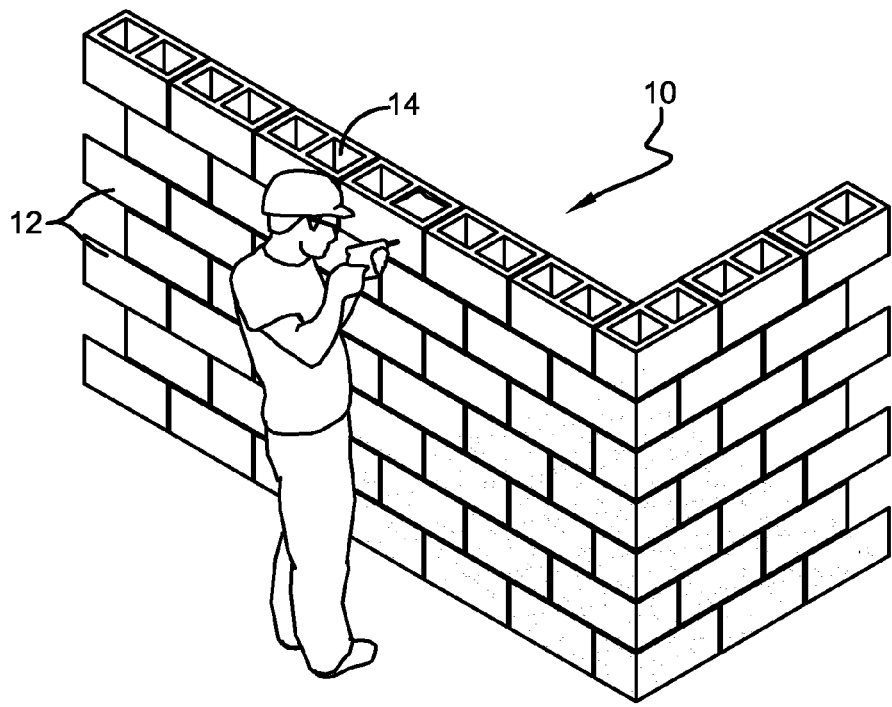
FIG. 2 is a view similar to FIG. 1 illustrating a user drilling a hole at a top of the cement block wall.

As illustrated in FIG. 2, the process is initiated by drilling a hole into a block cavity toward the top of the cement wall. It is not critical that the hole be drilled into the top course of the block, but it is preferable that the hole be positioned among the top several courses.

Figure 3:
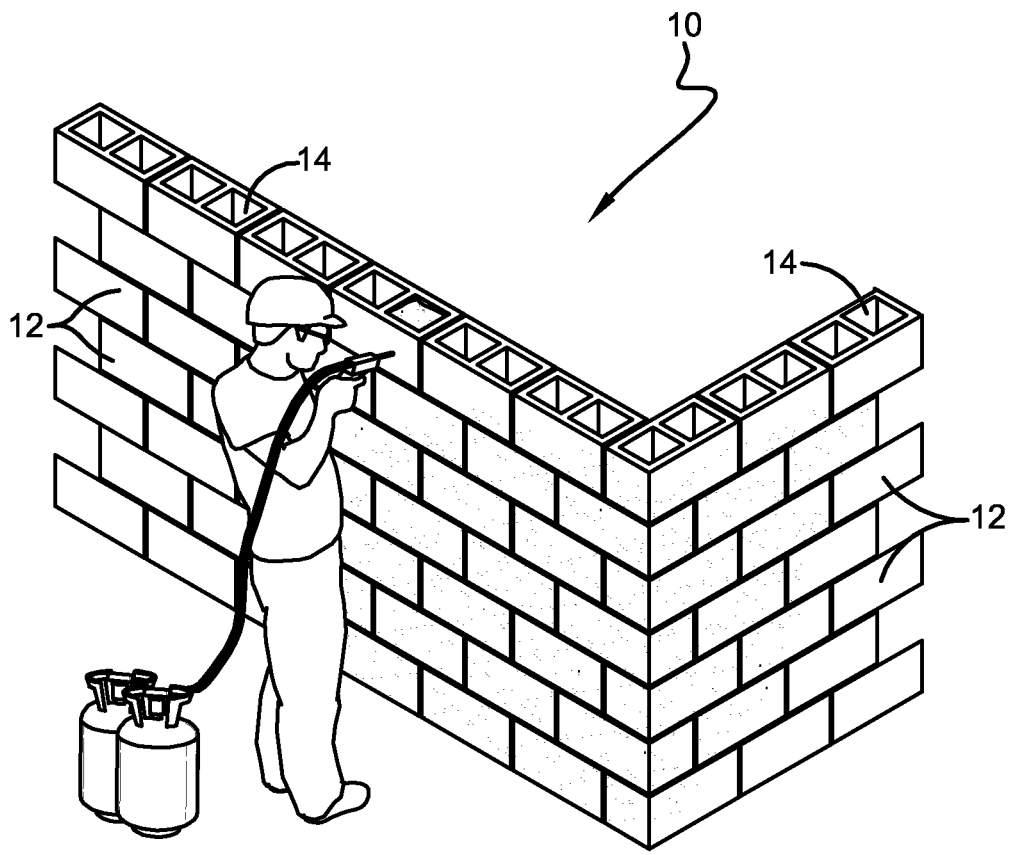
FIG. 3 is a view similar to FIG. 2 illustrating a user adding a two-component foam into the hole.
Figure 4H:
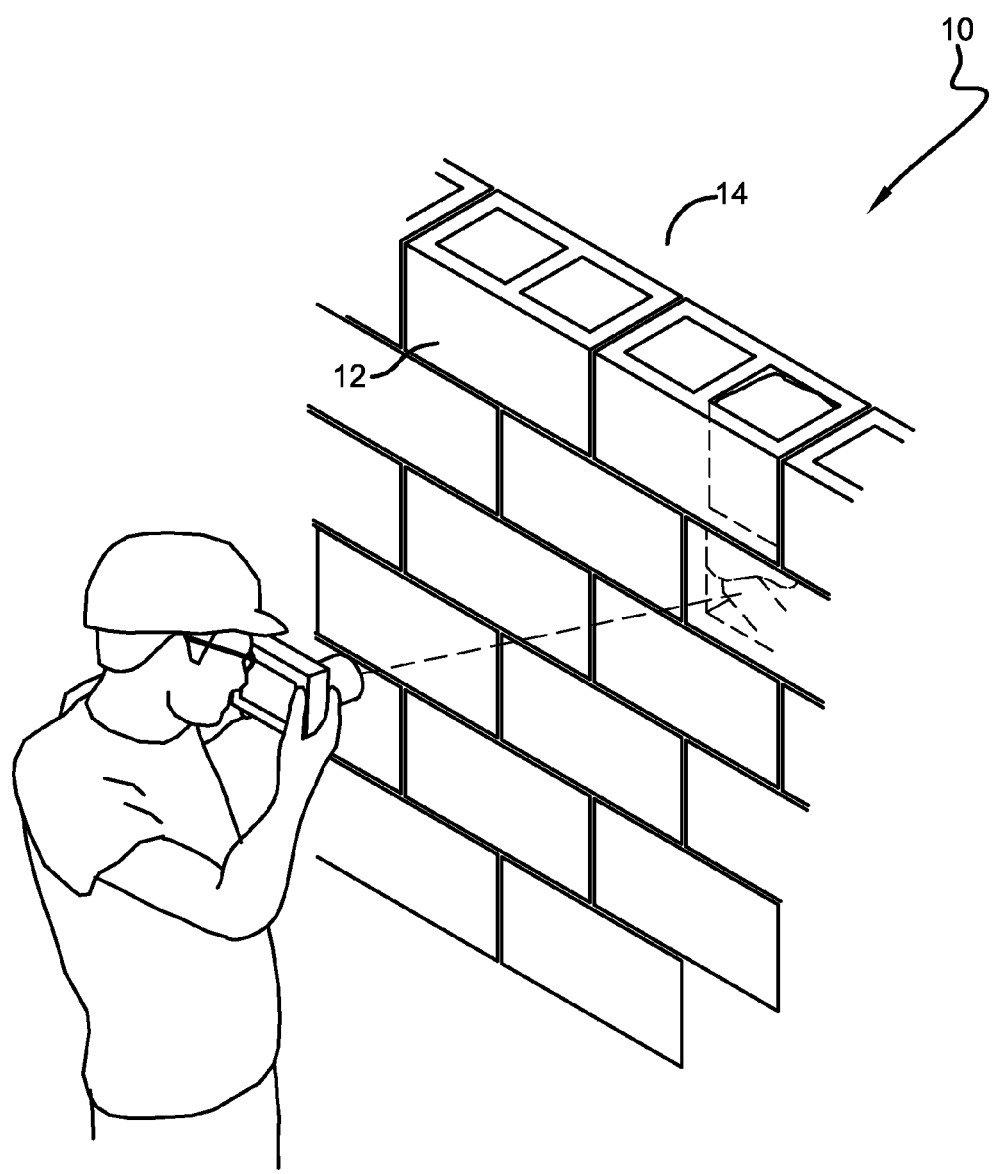
FIG. 4H is an expanded view of FIG. 4F illustrating the infrared detection of an obstruction in the vertical cavity of the second course of block.

The application of foam, illustrated in FIG. 3, is effected by inserting a foam spray nozzle and allowing the "A" and "B" chemicals to mix and initiating the foaming reaction. The nozzle optionally has an extender positioned on the nozzle tip to direct the "A" and "B" chemicals with associated blowing agents, downward into the cavity. As the foaming reaction is exothermic, progress of the reaction is monitored by a temperature monitoring device, which senses the temperature of the block as reflected on its exterior surface. This is often accomplished with the use of an infrared camera, e.g., a FLIR® Infrared camera, although other temperature sending devices and methodologies are envisioned within the scope of this invention. The monitoring achieves at least two purposes. First, it permits an installer to monitor the rise of the foam within the cavity so as to know when one cavity is filled. And second, it permits the installer to detect non-native obstructions within the cavity, such as plastic bottles or aluminum beverage cans, either of which inhibit the foaming reaction from initiating at the bottom of the wall cavity. FIGS. 4A through 4H illustrate the detection of a non-native obstruction within the cavity, e.g., a beverage container. By monitoring the reaction exotherm, it is possible to determine whether the vertical cavity has an obstruction disposed therein. If there is no obstruction, then the reaction exotherm will proceed from the bottom of the wall cavity to the top of the cavity. If there is an obstruction (illustrated in FIGS. 4F & 4H), the lack of an exotherm at the bottom of the vertical cavity will become self-evident as the reaction will only occur above the obstruction.

Figure 5:
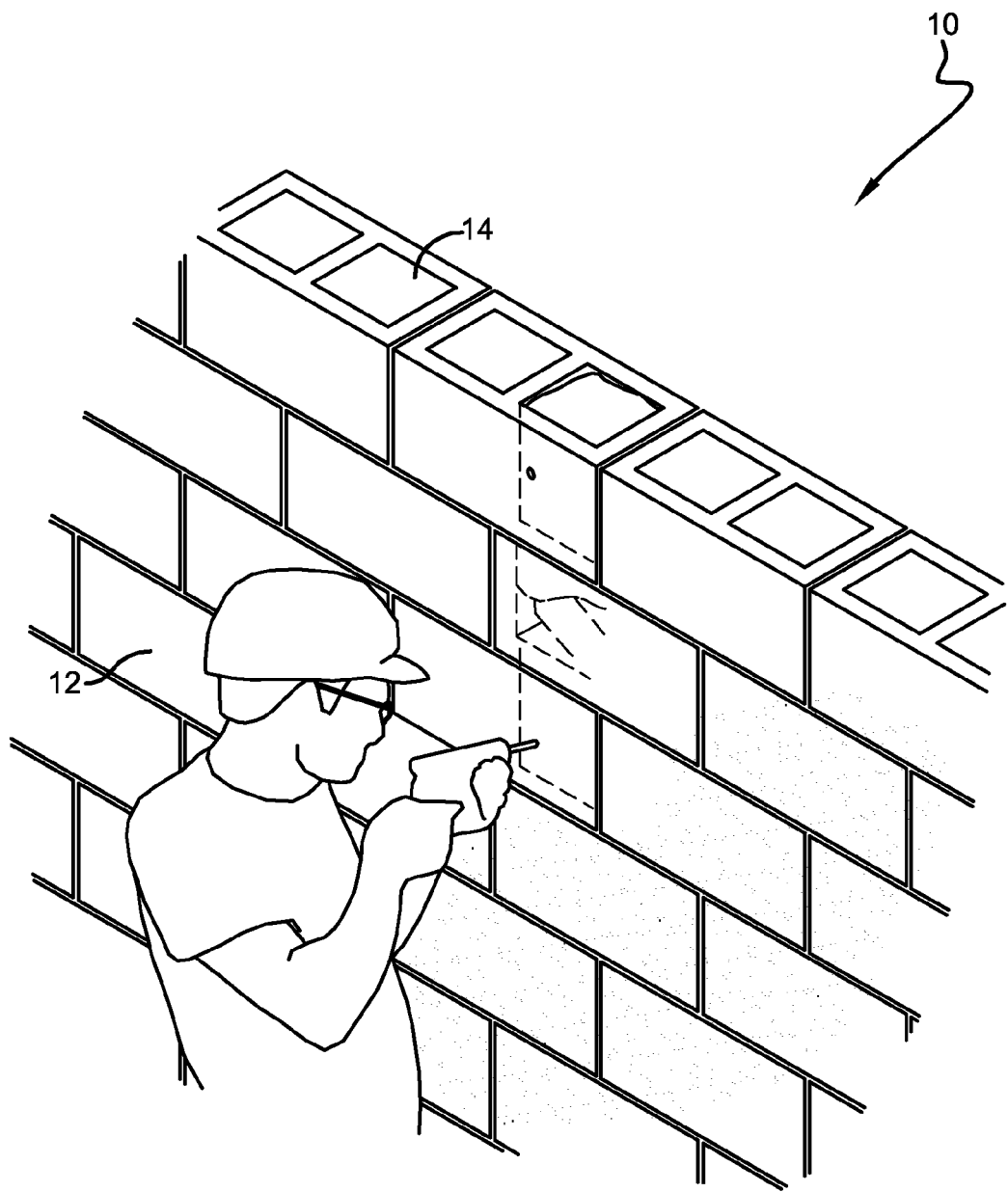
FIG. 5 is a view similar to FIG. 2 illustrating a user drilling a hole underneath the detected obstruction within a wall cavity of FIG. 4H based upon the wall exotherm (or lack thereof)
Figure 6:
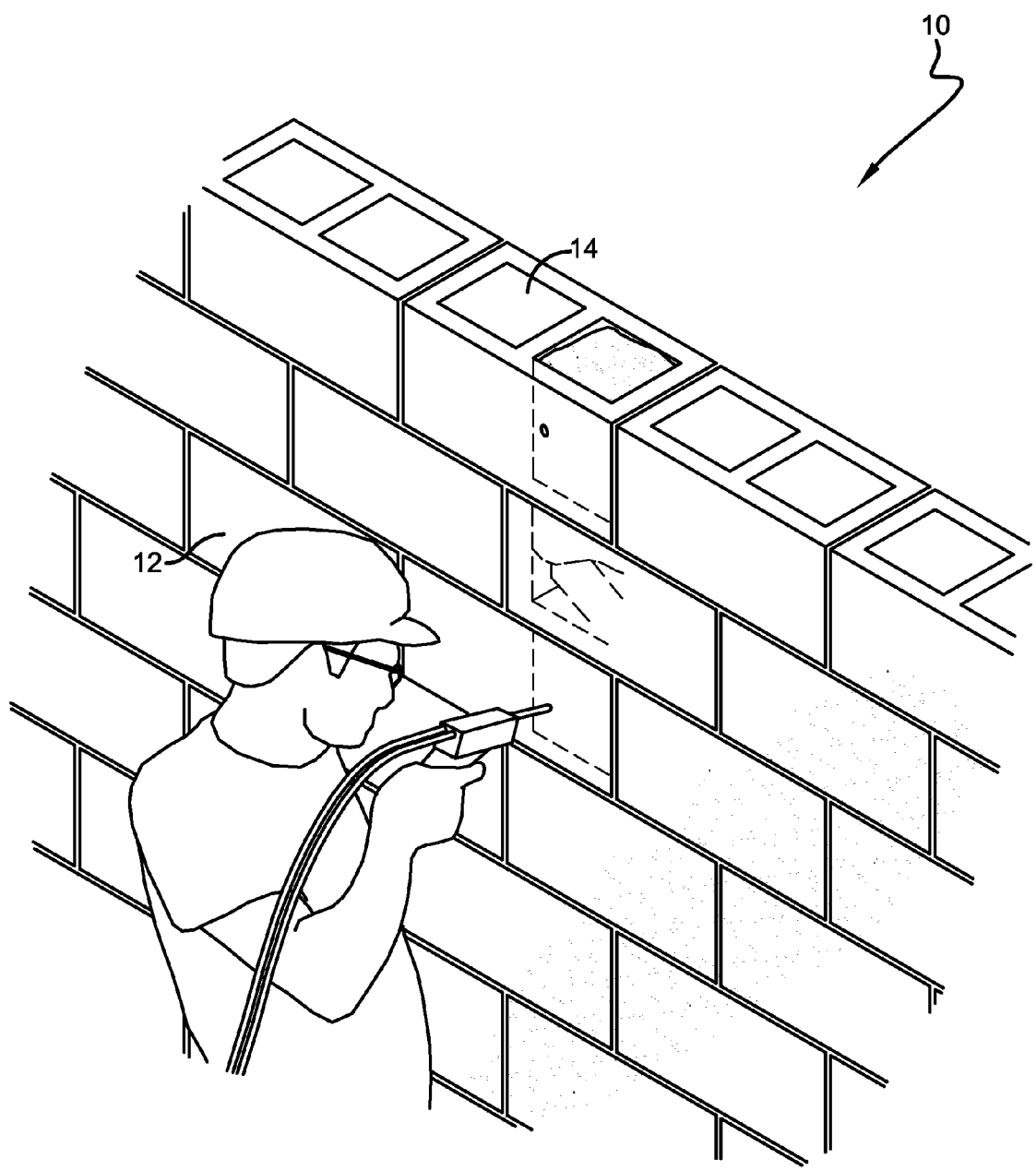
FIG. 6 is a view similar to FIG. 3 illustrating a user adding a two-component foam in the second hole.

As better illustrated in FIGS. 5-6, when detection of an obstruction occurs, the installer repeats the sequence illustrated in FIGS. 2-3 and drills a hole beneath the obstruction and begins the foam addition in that second hole (below the level of the obstruction in the vertical cavity), thereby more fully filling the entire vertical cavity with foam. The process is repeated until all cavities are filled with foam.

As used in this application, a non-limiting exemplary definition for the term "polyurethane" or "FUR", which includes mixtures of polyurethanes, means a class of reaction polymers in which a urethane linkage is produced by reacting an isocyanate group, —N═C═O with an hydroxyl (alcohol) group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, $R-(N=C=O)_{n \geq 2}$ and a polyol is a molecule with two or more hydroxyl functional groups, $R'-(OH)_{n \geq 2}$. The reaction product is a polymer containing the urethane linkage, —RNHCOOR'—. Isocyanates will react with any molecule that contains an active hydrogen. Importantly, isocyanates react with water to form a urea linkage and carbon dioxide gas. Commercially, polyurethanes are produced by reacting a liquid isocyanate with a liquid blend of polyols, catalyst, and other additives. The isocyanate is commonly referred to in North America as the "A-side" or just the "iso". The blend of polyols and other additives is commonly referred to as the "B-side" or as the "poly". In Europe these meanings are reversed.

As used in this application, a non-limiting exemplary definition for the term "isocyanate", which includes mixtures of isocyanates, means a moiety which contains an —N═C═O arrangement of chemical elements. Molecules that contain two isocyanate groups are called diisocyanates. Isocyanates can be classed as aromatic, such as diphenylmethane diisocyanate ("MDI") or toluene diisocyanate ("TDI"); or aliphatic, such as hexamethylene diisocyanate ("HDI"). An example of a polymeric isocyanate is polymeric diphenylmethane diisocyanate, which is a blend of molecules with two-, three-, and four- or more isocyanate groups, with an average functionality of 2.7. Isocyanates can be further modified by partially reacting them with a polyol to form a prepolymer. Important characteristics of isocyanates are their molecular backbone, % —N═C═O content, functionality, and viscosity. Any organic polyisocyanate can be employed in the polyurethane or polyisocyanurate foam synthesis inclusive of aliphatic and aromatic polyisocyanates. Suitable organic polyisocyanates include aliphatic, cycloaliphatic, arylaliphatic, aromatic, and heterocyclic isocyanates which are well known in the field of polyurethane chemistry. Representative organic polyisocyanates correspond to the formula:

R(NCO)$_z$ wherein R is a polyvalent organic radical which is either aliphatic, arylalkyl, aromatic or mixtures thereof, and z is an integer which corresponds to the valence of R and is at least two. Representative of the organic polyisocyanates contemplated herein includes, for example, the aromatic diisocyanates such as 2,4-toluene diisocyanate, 2,6-toluene diisocyanate, mixtures of 2,4- and 2,6-toluene diisocyanate, crude toluene diisocyanate, methylene diphenyl diisocyanate, crude methylene diphenyl diisocyanate and the like; the aromatic triisocyanates such as 4,4',4"-triphenylmethane triisocyanate, 2,4,6-toluene triisocyanates; the aromatic tetraisocyanates such as 4,4'-dimethyldiphenylmethane-2,2'5,5'-tetraisocyanate, and the like; arylalkyl polyisocyanates such as xylylene diisocyanate; aliphatic polyisocyanate such as hexamethylene-1,6-diisocyanate, lysine diisocyanate methylester and the like; and mixtures thereof. Other organic polyisocyanates include polymethylene polyphenylisocyanate, hydrogenated methylene diphenylisocyanate, m-phenylene diisocyanate, naphthylene-1,5-diisocyanate, 1-methoxyphenylene-2,4-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; Typical aliphatic polyisocyanates are alkylene diisocyanates such as trimethylene diisocyanate, tetramethylene diisocyanate, and hexamethylene diisocyanate, isophorene diisocyanate, 4,4'-methylenebis(cyclohexyl isocyanate), and the like; typical aromatic polyisocyanates include m-, and p-phenylene diisocyanate, polymethylene polyphenyl isocyanate, 2,4- and 2,6-toluenediisocyanate, dianisidine diisocyanate, bitoylene isocyanate, naphthylene 1,4-diisocyanate, bis(4-isocyanatophenyl)methene, bis(2-methyl-4-isocyanatophenyl)methane, and the like.

As used in this application, a non-limiting exemplary definition for the term "polyol", which includes mixtures of polyols, can be any polyol which reacts in a known fashion with an isocyanate in preparing a polyurethane or polyisocyanurate foam. In one sense, polyol means a moiety which contains more than one hydroxyl group. Molecules that contain two hydroxyl groups are called diols, those with three hydroxyl groups are called triols, et cetera. Polyols are polymers in their own right. They are formed by base-catalyzed addition of propylene oxide ("PO"), ethylene oxide ("EO") onto a hydroxyl or amine containing initiator, or by polyesterification of a di-acid, such as adipic acid, with glycols, such as ethylene glycol ("EG") or dipropylene glycol ("DPG"). Polyols extended with PO or EO are polyether polyols. Polyols formed by polyesterification are polyester polyols. The choice of initiator, extender, and molecular weight of the polyol greatly affect its physical state, and the physical properties of the polyurethane polymer. Important characteristics of polyols are their molecular backbone, initiator, molecular weight, % primary hydroxyl groups, functionality, and viscosity. Useful polyols comprise one or more of a sucrose containing polyol; phenol, a phenol formaldehyde containing polyol; a glucose containing polyol; a sorbitol containing polyol; a methylglucoside containing polyol; an aromatic polyester polyol; polyols derived from natural products (e.g. soy beans), glycerol; ethylene glycol; diethylene glycol; propylene glycol; graft copolymers of polyether polyols with a vinyl polymer; a copolymer of a polyether polyol with a polyurea; one or more of (a) condensed with one or more of (b) as illustrated by (a) glycerine, ethylene glycol, diethylene glycol, trimethylolpropane, ethylene diamine, pentaerythritol, soy oil, lecithin, tall oil, palm oil, castor oil; and (b) ethylene oxide, propylene oxide, a mixture of ethylene oxide and propylene oxide; or combinations thereof.

As used in this application, a non-limiting exemplary definition for the term "polyol premix", which includes mixtures of polyol premixes, means a polyol premix which includes a catalyst. Useful catalysts are primary amines, secondary amines or most typical tertiary amines. Useful tertiary amine catalysts non-exclusively include dicyclohexylmethylamine; ethyldiisopropylamine; dimethylcyclohexylamine; dimethylisopropylamine; methylisopropylbenzylamine; methylcyclopentylbenzylamine; isopropyl-sec-butyl-trifluoroethylamine; diethyl-(α-phenylethyl)amine, tri-n-propylamine, or combinations thereof. Useful secondary amine catalysts non-exclusively include dicyclohexylamine; t-butylisopropylamine; di-t-butylamine; cyclohexyl-t-butylamine; di-sec-butylamine, dicyclopentylamine; di-(α-trifluoromethylethyl)amine; di-α-phenylethyl)amine; or combinations thereof. Useful primary amine catalysts non-exclusively include: triphenylmethylamine and 1,1-diethyl-n-propylamine. Other useful amines include morpholines, imidazoles, ether containing compounds, and the like. These include dimorpholinodiethylether; N-ethylmorpholine; N-methylmorpholine; bis(dimethylaminoethyl)ether; imidazole; n-methylimidazole; 1,2-dimethylimidazol; dimorpholinodimethylether; N,N,N',N',N",N"-pentamethyldiethylenetriamine; N,N,N',N',N",N"-pentaethyldiethylenetriamine; N,N,N',N',N",N"-pentamethyldipropylenetriamine; bis(diethylaminoethyl)ether; and bis(dimethylaminopropyl)ether. The polyol premix composition may contain an optional silicone surfactant. The silicone surfactant is used to form a foam from the mixture, as well as to control surface tension that impacts the size of the bubbles of the foam so that a foam of a desired open or closed cell structure is obtained. Preferably, a foam with small bubbles or cells therein of uniform size is desired since it has the most desirable physical properties such as compressive strength and thermal conductivity. Also, it is critical to have a foam with stable cells which do not collapse prior to forming or during foam rise. The polyol premix composition may optionally contain a non-silicone surfactant, such as a non-silicone, non-ionic surfactant. These may include oxyethylated alkylphenols, oxyethylated fatty alcohols, paraffin oils, castor oil esters, ricinoleic acid esters, turkey red oil, groundnut oil, paraffins and fatty alcohols. A preferred non-silicone surfactant is LK-443 which is commercially available from Air Products Corporation.

As used in this application, a non-limiting exemplary definition for the term "polyisocyanurate" or "PIR", which includes mixtures of polyisocyanurates, means the reaction the reaction product of MDI and a polyol, which typically takes place at higher temperatures compared to the reaction temperature for the manufacture of PUR. Without being limited to any theory of operation or synthesis, at these elevated temperatures and in the presence of specific catalysts, MDI will first react with itself, producing a stiff, ring molecule, which is a reactive intermediate (a tri-isocyanate isocyanurate compound). Remaining MDI and the tri-isocyanate react with polyol to form a complex poly(urethane-isocyanurate) polymer, which is foamed in the presence of a suitable blowing agent. This isocyanurate polymer has a relatively strong molecular structure, because of the combination of strong chemical bonds, the ring structure of isocyanurate and high cross link density, each contributing to the greater stiffness than found in comparable polyurethanes. The greater bond strength also means these are more difficult to break, and as a result a PIR foam is chemically and thermally more stable: breakdown of isocyanurate bonds is reported to start above 200° C., compared with urethane at 100 to 110° C. PIR typically has an MDI/polyol ratio, also called its index (based on isocyanate/polyol stoichiometry to produce urethane alone), of between 200 and 500. By comparison PUR indices are normally around 100. As the index increases material stiffness but also brittleness also increase, although the correlation is not linear. Depending on the product application greater stiffness, chemical and/or thermal stability may be desirable. As such PIR manufacturers offer multiple products with identical densities but different indices in an attempt to achieve optimal end use performance.

As used in this application, a non-limiting definition for the term "blowing agent" which includes miscible mixtures and azeotropes of blowing agents, means a propellant or solvent which are useful and provide efficacy to various applications in the form of insulation performance, pressure performance, or solubility, without deleterious effect due to molar gas volume, flammability migration, or GWP reduction, yet which have a vapor pressure within defined limits as defined herein. Exemplary and non-limiting blowing agents include HFC-245fa (Honeywell Intl.), namely 1,1,1,3,3 pentafluoropentane or FEA-1100 (DuPont), namely 1,1,1,4,4,4 hexafluoro-2-butene.

It is often necessary or even desirable to mitigate the global warming potential ("GWP") of blowing agent, aerosol, or solvent compositions. As used herein, GWP is measured relative to that of carbon dioxide and over a 100 year time horizon, as defined in "The Scientific Assessment of Ozone Depletion, 2002, a report of the World Meteorological Association's Global Ozone Research and Monitoring Project." In certain preferred forms, the present compositions also preferably have an Ozone Depletion Potential ("ODP") of not greater than 0.05, more preferably not greater than 0.02 and even more preferably about zero. As used herein, "ODP" is as defined in "The Scientific Assessment of Ozone Depletion, 2002, A Report of the World Meteorological Association's Global Ozone Research and Monitoring Project."

As used herein, a non-limiting definition for the term "co-blowing agent" which includes mixtures or miscible blends and/or azeotropes of blowing agents, means a one or more co-blowing agents, co-propellants, or co-solvents which are useful and provide efficacy to various applications in the form of insulation performance, pressure performance, or solubility, without deleterious effect due to molar gas volume, flammability mitigation, or GWP reduction. These co-agents include but are not limited to: one or more additional components of hydrofluorocarbons, $C_1$ to $C_6$ hydrocarbons, $C_1$ to $C_8$ alcohols, ethers, diethers, aldehydes, ketones, hydrofluoroethers, $C_1$ to $C_4$ chlorocarbons, methyl formate, water, carbon dioxide, $C_3$ to $C_4$ hydrofluoroolefins, and $C_3$ to $C_4$ hydrochlorofluoroolefins. Examples of these non-exclusively include one or more of difluoromethane, trans-1,2-dichloroethylene, difluoroethane, 1,1,1,2,2-pentafluoroethane, 1,1,2,2-tetrafluoroethane, 1,1,1,2-tetrafluoroethane, 1,1,1-trifluoroethane, 1,1-difluoroethane, fluoroethane, hexafluoropropane isomers, including HFC-236fa, pentafluoropropane isomers of HFC-245fa, heptafluoropropane isomers, including HFC-227ea, hexafluorobutane isomers, and pentafluorobutane isomers including HFC-365mfc, tetrafluoropropane isomers, and trifluoropropene isomers (HFO-1243). Specifically included are all molecules and isomers of HFO-1234, including 1,1,1,2-tetrafluoropropene (HFO-1234yf), and cis- and trans-1,2,3,3-tetrafluoropropene (HFO-1234ye), HFC-1233zd, and HFC-1225ye. Preferred co-blowing agents non-exclusively include: hydrocarbons, methyl formate, halogen containing compounds, especially fluorine containing compounds and chlorine containing compounds such as halocarbons, fluorocarbons, chlorocarbons, fluorochlorocarbons, halogenated hydrocarbons such as hydrofluorocarbons, hydrochlorocarbons, hydrofluorochlorocarbons, hydrofluoroolefins, hydrochlorofluoroolefins, $CO_2$, $CO_2$ generating materials such as water, and organic acids that produce $CO_2$ such as formic acid. Examples non-exclusively include low-boiling, aliphatic hydrocarbons such as ethane, propane(s), i.e. normal pentane, isopropane, isopentane and cyclopentane; butanes(s), i.e. normal butane and isobutane; ethers and halogenated ethers; trans 1,2-dichloroethylene, pentafluorobutane; pentafluoropropane; hexafluoropropane; and heptafluoropropane; 1-chloro-1,2,2,2-tetrafluoroethane (HCFC-124); and 1,1-dichloro-1-fluoroethane (HCFC-141b) as well as 1,1,2,2-tetrafluoroethane (HFC-134); 1,1,1,2-tetrafluoroethane (HFC-134a); 1-chloro 1,1-difluoroethane (HCFC-142b); 1,1,1,3,3-pentafluorobutane (HFC-365mfc); 1,1,1,2,3,3,3-heptafluoropropane (HCF-227ea); trichlorofluoromethane (CFC-11), dichlorodifluoromethane (CFC-12); 1,1,1,3,3,3-hexafluoropropane (HFC-236fa); 1,1,1,2,3,3-hexafluoropropane (HFC-236ea); difluoromethane (HFC-32); difluoroethane (HFC-152a); trifluoropropenes, pentafluoropropenes, chlorotrifluoropropenes, tetrafluoropropenes including 1,1,1,2-tetrafluoropropene (HFO-1234yf), 1,1,1,2,3-pentafluoropropene (HFO-1225ye), and 1-chloro-3,3,3-trifluoropropene (HCFC-1233zd). Combinations of any of the aforementioned are useful. The relative amount of any of the above noted additional co-blowing agents, as well as any additional components included in present compositions, can vary widely within the general broad scope of the present invention according to the particular application for the composition, and all such relative amounts are considered to be within the scope hereof.

As used herein, a non-limiting definition for the term, "effective amount" means a quantity sufficient to improve the result of the foaming operation when compared to a control without the added low pressure blowing agent.

As used herein, a non-limiting definition for the term, "higher boiling point blowing agent" means a blowing agent having a boiling point at atmospheric pressure of between ~5° C. to ~50° C., more preferably ~10° C. to ~40° C.

As used herein, a non-limiting definition for the term "lower pressure blowing agent" means a blowing agent having a vapor pressure of between ~5 psig to ~30 psig at approximately room temperature, ~75° F. (equivalently ~34.5 kPa to ~206.9 kPa at approximately room temperature, ~24° C.).

As used herein, a non-limiting definition for the term "approximately" means a deviation from the stated end points of a range of 10%.

One aspect of the present invention provides foamable compositions. As is known to those skilled in the art, foamable compositions generally include one or more foam forming agents capable of forming a foam and a blowing agent.

This includes a component, or a combination on components, which are capable of forming a foam structure, preferably a generally cellular foam structure. The foamable compositions of the present invention include such components and the above described blowing agent compound in accordance with the present invention. In certain embodiments, the one or more components capable of forming foam comprise a thermosetting composition capable of forming foam and/or foamable compositions. Examples of thermosetting compositions include polyurethane and polyisocyanurate foam compositions. These include polyurethane pre-polymers. This reaction and foaming process may be enhanced through the use of various additives such as catalysts and surfactant materials that serve to control and adjust cell size and to stabilize the foam structure during formation. Furthermore, it is contemplated that any one or more of the additional components described above with respect to the blowing agent compositions of the present invention could be incorporated into the foamable composition of the present invention. In such thermosetting foam embodiments, one or more of the present compositions are included as or part of a blowing agent in a foamable composition, or as a part of a two or more part foamable composition, which preferably includes one or more of the components capable of reacting and/or foaming under the proper conditions to form a foam or cellular structure.

The polymerization reaction is catalyzed by tertiary amines, such as dimethylcyclohexylamine, and organometallic compounds, such as dibutyltin dilaurate or bismuth octanoate. Furthermore, catalysts can be chosen based on whether they favor the urethane (gel) reaction, such as 1,4-diazabicyclo[2.2.2]octane (also called DABCO or TEDA), or the urea (blow) reaction, such as bis-(2-dimethylaminoethyl) ether, or specifically drive the isocyanate trimerization reaction, such as potassium octoate.

At its simplest level, the distinction between PIR and PUR polymers is not large. The proportion of MDI is higher than for PUR and instead of a polyether polyol, a polyester derived polyol is used in the reaction. Catalysts and additives used in PIR formulations also differ from those used in PUR.

The properties of foam expansion agents is listed in Table I, as well as various physical properties therewith.

TABLE I

| | CFC-11 | HCFC-141b | HFC-245fa | 1HFC-34a | HFC-365mfc | Isopentane | FEA-1100 |
|---|---|---|---|---|---|---|---|
| ODP | 1 | 0.12 | 0 | 0 | 0 | 0 | 0 |
| GWP (100 year ITH) | 4750 | 725 | 1020 | 1300 | 782 | 11 | 5 |
| E gas 25° C. mW/mK | 8.4 | 9.7 | 12.7 | | 10.5 | 13.3 | 10.7 |
| Flash Point | None | None | None | None | −25.0° C. | −51° C. | None |
| bp ° C. | 23.9 | 32.1 | 15.3 | −26.3 | 40.0 | 27.9 | >25 |

The experimental data presented herein centers on the use of a low vapor pressure blowing agent, such as that illustrated by either HFC-245fa (1,1,1-3,3-pentafluoropropane) or FEA-1100 (1,1,1,4,4,4-hexafluoro-2-butene), used alone or in miscible blends with other blowing agents. Both FEA-1100 (DuPont) and HFC-245fa have low vapor pressures at room temperature. Both blowing agents have a vapor pressure at 50° C. which is well below that of a typical drum pressure rating of 22 psig. Additional fourth generation blowing agents are also within the scope of this invention, e.g., AFA-L1 & AFA-L2 (Arkema), HBA-2 (Honeywell) or trans-1-chloro-3,3,3-trifluoropropene) in that they also meet the criteria of higher boiling point and lower vapor pressure as defined herein with minimal to no ozone depletion potential.

The choice of blowing agent is largely driven by the Environmental Protection Agency of the United States ("EPA"), a zero ozone-depletion potential ("ODP"), as well as Department of Transportation ("DOT") flammability regulations. Environmental concerns with ozone depletion rule out the use of the extremely ozone-depleting CFC-1, banned in 1995, and HCF-141b, banned in 2003. Without restricting this invention to the exclusive use of non-flammable blowing agents in a composition, in a preferred embodiment, non-flammable blowing agents are preferred over flammable blowing agents. DOT regulations prevent the filling of commonly-used, standard-in-the-industry disposable and refill cylinders with flammable blowing agents. From the above chart, this leaves HFC-134a, HFC-245fa and FEA-1100 as the only permissible blowing agents. The intent of the invention is to produce a low pressure build, PUR/PIR insulation system applied via low pressure disposable and refill equipment that demonstrates superior flowability while maintaining desirable properties such as being dimensionally stable (will not shrink) provide for an air barrier and insulate. As demonstrated in FIGS. 1-9, HFC-134a is eliminated from being a suitable blowing agent due to its low boiling point. Upon dispensing HFC-134a blown formulations from low pressure systems, the rapid expansion of the foam and viscous, frothy state of the foam prevent the system from flowing around cavity obstructions and thereby produces undesirable void spaces in the cavity resulting in a compromised air seal and insufficient insulation. This dictates that only non-flammable, non-ozone depleting blowing agents with relatively high boiling points can effectively provide for adequate filling of an obstructed cavity. Though it is intuitively obvious that the greater the solubility of the blowing agent the greater the flow of the resultant froth, this factor does not dictate performance as does the high boiling point of the blowing agent. The KB value of HFC-245fa is six (6) while the KB value of FEA-1100 is seven (7). The kauri-butanol value is a semi-qualitative measure of a blowing agent's solubility in a standard solution of kauri gum in butyl alcohol as outlined in ASTM D 1133. It is also counterintuitive that the quick reaction profile of the compositions of this invention would essentially completely fill a cavity wall, when conventional wisdom would instruct a formulator that reaction profiles with long cream times would be more effective, as discussed in later paragraphs.

Without being limited to any one theory or mode of operation, it is believed that the combination of a higher boiling point in the range of approximately 5° C. to 50° C., more preferably approximately 10° C. to 40° C. provides the unexpected flowability results of this invention.

In one aspect of the invention, a disposable and/or refillable pressurized two-component foam formulation is illustrated. The system is optionally, but preferably, portable. The propellant is preferably a high boiling point propellant with minimal to zero ozone depleting potential in addition to a stable shelf life.

In another aspect of the invention, a low density foam is achieved by the incorporation of difunctional flame retardants into the formulation that do not terminate the polyurethane polymerization reaction. Additionally, a further enhancement is obtained by the incorporation of a difunctional surfactant that does not chain terminate while additionally functioning to emulsify the highly incompatible water and hydrophilic components with the hydrophobic flame retardants.

In yet another aspect of the invention, the amount of flame retardant is adjusted to secure a Class II rating. This rating can be increased to a Class I E-84 Steiner Tunnel test rating by the synergistic blend incorporation of chlorinated phosphate flame retardant in combination with a brominated aromatic diol.

Example #1

The following compositions were added to test experimental cavity fills to determine the value of adding the foam. Table II illustrates the various polyol blends used in the "B" side cylinder.

TABLE II

| Components in "B" side blend | Description | Viscosity @ 25° C. (cP) | OH # | Average Functionality |
|---|---|---|---|---|
| (a) | oxypropylated aliphatic amine | 380 | 600 | 3.0 |
| (b) | sucrose glycerine propoxylated polyether polyol | 3,152 | 360 | 4.5-5.0 |
| (c) | modified phthalic acid aromatic polyester polyol | 2,700 | 350 | 2.2 |
| (d) | brominated phthalate diol | 95,580 | 218 | 2.0 |

Table III illustrates the ratios usable in the invention.

TABLE III

| Component | Description | Weight %(*) |
|---|---|---|
| "A" | Polymeric methylene diisocyanate | 100% |
| "B" | Polyol Blend | |
| (a) | Blend component (a) - Polyether polyol is designed to reduce viscosity and balance stoichiometry. | 25-45% |
| (b) | Blend component (b) - Sucrose propoxylated polyether polyol ensures dimensional stability in a flexible foam/high water content formulation. | 5-15% |
| (c) | Blend component (c) - Modified phthalic acid aromatic polyester polyol enhances fire resistance. | 5-15% |
| (d) | Blend component (d) - Flame retardant and phthalate aromatic ring adds thermal stability. The difunctional hydroxyl group reacts in the resin matrix by increasing thermal and dimensional stability. | 2-15% |
| | Surfactant(s) Polyether polydimethylsiloxane copolymer foam stabilizer, e.g., Tegostab ® B-8499 Non-silicone containing organic surfactant having a viscosity at 25 C. of 2600 cps, 20% sol. In water, and an average OH# of 36 containing 0.1-1% N-vinyl-2-pyrrolidone, e.g., Dabco ® LK-443 | 1-5% |
| | Catalyst(s) Tertiary amine pentamethyldiethylenetriamine, e.g., Polycat ® 5 Potassium octoate in diethylene glycol, e.g., Dabco ® K-15 | 1-5% |
| | Water | balance (0.5-3%) |
| | Final Formulation | |
| "A" | PMDI | 94% |
| | $CF_3CH_2CHF_2$ (HFC-245fa) | 6% |
| "B" | Blend | 89% |
| | $CF_3CH_2CHF_2$ (HFC-245fa) | 11% |

(*)Percentages of components listed for the "B" side are adjusted so that the total weight is 100%

The above "B" side (50-75% polyols) were mixed with an "A" side (90-95% PMDI) having an average functionality of 2.7, in an approximately 50/50 ratio with an appropriate amount of propellant necessary to bring the total of each side to 100%.

Table IV illustrates non-limiting permissible blowing agents usable in the invention.

TABLE IV

| Blowing Agents | Common Name | M.W. | B.P. | ODP |
|---|---|---|---|---|
| $CF_3CH_2CHF_2$ | HFC-245fa | 134 | 15.3° C. | 0 |
| $CF_3CH_2CF_2CH_3$ | HFC-365mfc | 148 | 40.2° C. | 0 |
| $CF_3CH=CHCl$ | HBA-2 | 131 | 19° C. | 0 |
| $CF_3CH=CHCF_3$ | FEA-1100 | 164 | 33° C. | 0 |
| | AFA-L1 | <134 | >10° C. and <30° C. | 0 |
| | AFA-L2 | <134 | >10° C. and <30° C. | 0 |

While the above blowing agents are listed individually, it is recognized that miscible binary and ternary blends of the agents listed above, in addition to miscible blends which fall both within the higher boiling point range as well as outside the range, are useful in the practice of the invention. At least one of the agents (preferably the blowing agent in the major amount) will fall within the higher boiling point range.

Table V illustrates the average hydroxyl number of just the various combinations of polyols, namely (a) through (d) of Table II on the "B" side used in the experimental testing illustrated in Table VI prior to the addition of surfactants and flame retardants.

TABLE V

| "B" side OH # | % of (a) | % of (b) | % of (c) | % of (d) |
|---|---|---|---|---|
| 296.6 | 34.2 | 10.0 | 9.6 | 10.0 |
| 239.0 | 10.0 | 34.2 | 10.0 | 9.6 |
| 235.1 | 9.6 | 10.0 | 34.2 | 10.0 |
| 204.1 | 10.0 | 9.6 | 10.0 | 34.2 |

Table VI illustrates the overall hydroxyl number of the "B" side (polyols (a) through (d) of Table II plus other surfactants and flame retardants) which also contribute to the hydroxyl number.

TABLE VI

| Expt. # | Overall "B" side OH # | % of (a) | % of (b) | % of (c) | % of (d) | "B" polyol % |
|---|---|---|---|---|---|---|
| (1) | 364 | 34.2 | 10.0 | 9.6 | 10.0 | 63.8 |
| (2) | 307 | 10.0 | 34.2 | 10.0 | 9.6 | 63.8 |
| (3) | 303 | 9.6 | 10.0 | 34.2 | 10.0 | 63.8 |
| (4) | 272 | 10.0 | 9.6 | 10.0 | 34.2 | 63.8 |

Table VII illustrates the effect of various polyol blends of Table VI when used in combination with the formulation of Table III.

TABLE VII

| Expt. # | B-side OH# | A-side (psig) | B-side (psig) | ΔP (psig) | A/B ratio | Gel (sec) | Tack (sec) | Density (pcf) | R-value (English) | Closed cell content |
|---|---|---|---|---|---|---|---|---|---|---|
| (1) | 364 | 80 | 95 | 15 | 1.11 | 37 | 57 | 1.99 | 7.02 | 90.18 |
| (2) | 307 | 67 | 114 | 47 | 1.11 | 44 | 69 | 2.11 | 6.96 | 88.88 |
| (3) | 303 | 70 | 119 | 49 | 1.10 | 28 | 47 | 2.14 | 6.98 | 78.88 |
| (4) | 272 | 66 | 116 | 50 | 1.06 | 33 | 67 | 2.19 | 6.83 | 87.77 |

It should be noted that widely discrepant A- and B-side pressure as a result of high B-side viscosities are undesirable as illustrated in the ΔP column in Table VII. While higher values are workable in the invention, it is preferred that the pressure different between the cylinders be less than or equal to 30 psig, more preferably less than or equal to 20 psig. It is clear that on-ratio foam dispensing pressures become excessive when lower hydroxyl (equivalently higher viscosity) polyols are employed (e.g., less than or equal to approximately 350). It is further noted that high B-side viscosities are detrimental to mixing and low temperature performance. It is additionally observed that using polyol blends with lower hydroxyl numbers (e.g., less than or equal to approximately 350) have an undesirable cell-opening effect. It is preferable that the closed cell content of the polyurethane foam be greater than or equal to 90%, although lower content polyurethane foams are usable in the invention, merely less desirable. Class I two-component foam ratings require that the closed cell content of the polyurethane foam exceed 90%.

Table VIII illustrates the need for a B-side hydroxyl value of approximately equal to or greater than 350 for dimensional stability. The test measures post volumetric expansion of a 4"×4"×1" rectangular solid. Greater than or less than 5% of the original volume is the criteria for lack of dimensional stability and connotes failure. The dimensional stability becomes progressively worse with the use of polyol blends with lower hydroxyl numbers (less than approximately 350).

TABLE VIII

| Expt. # | B-side OH# | D-stability RT (% vol. Δ) | D-stability −20° C. (% vol. Δ) | D-stability 70° C. (% vol. Δ) | D-stability 70° C. wet (% vol. Δ) | Compressive strength psi |
|---|---|---|---|---|---|---|
| (1) | 364 | Pass | Pass | Pass | Pass | 21.13 |
| (2) | 307 | Pass | Pass | Pass | Pass | 27.81 |
| (3) | 303 | Pass | Pass | Pass | +7.76 | 28.98 |
| (4) | 272 | Pass | −6.16 | Pass | Pass | 25.04 |

As illustrated above, the polyol blend contains at least a halogenated phthalate-based polyol having at least approximately 25% halogens, more preferably approximately at least 30%, and most preferably at least approximately 40% halogens, wherein the halogen is preferably bromine. The sugar polyol is a preferably a sucrose/glycerine polyether polyol, more preferably a sucrose/glycerine alkoxylated polyether polyol, and most preferably a sucrose/glycerine propoxylated polyether polyol. The hydroxyl number of the polyol blend is approximately 350 or greater. The pressure differential between the "A" and "B" side components is preferably less than or equal to 30 psig, more preferably less than or equal to 20 psig and an A-side/B-side ratio approximately equal to or greater than 1.0 Hydroxyl numbers in that range produce closed cell foams of approximately 90% or greater (Table VII) and with dimensional stability (Table VIII).

As a generalization, classic pour-in-place systems do not utilize significant amounts of low molecular weight polyols (i.e., component (a) above) with large hydroxyl values. Too much crosslink density typically develops during cure which impedes the flow of foam in a cavity. The use of the polyol blend in the invention is counterintuitive. For traditional pour-in-place systems, slow reacting polyols having a high molecular weight and low hydroxyl value and linear are the traditionally preferred materials.

Listed more generically, the blowing agents having up to four carbon atoms in their backbone and which are useful in this invention fall within the general formula (I) illustrated below:

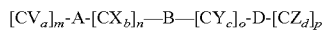

$[CV_a]_m\text{-}A\text{-}[CX_b]_n\text{—}B\text{—}[CY_c]_o\text{-}D\text{-}[CZ_d]_p$ wherein C is a carbon atom;

V, X, Y & Z are independently selected from the group consisting of H, F and Cl (with similar definitions applied as illustrated previously);

a & d are independently selected from the integral values ranging from 0 to 3 inclusive;

b & c are independently selected from the integral values ranging from 0 to 2 inclusive;

o, p & n are equal to 1;

m is selected from the integral values ranging from 0 to 1 inclusive;

A, B & D are covalent bonds sufficient to satisfy the available bonding sites of adjacent carbon atoms, if such carbon atoms are present; and said blowing agent, including miscible blends and azeotropes thereof, having a boiling point between approximately 5-50° C., and an ozone depletion potential of essentially zero.

said foam system having a reaction profile gel and tack time which is less than approximately 90 seconds, more preferably less than approximately 60 seconds, most preferably less than approximately 45 seconds; and in a preferred embodiment, said blowing agent is non-flammable, recognizing that co-blowing agents may be flammable.

Listed more generically, the blowing agents having up to six carbon atoms in their backbone and which are useful in this invention fall within the general formula (II) illustrated below:

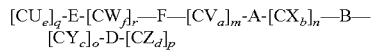

$[CU_e]_q$-E-$[CW_f]_r$—F—$[CV_a]_m$-A-$[CX_b]_n$—B—$[CY_c]_o$-D-$[CZ_d]_p$ wherein C is a carbon atom;

U, W, V, X, Y and Z are independently selected from the group consisting of H, F and Cl (with similar definitions applied as illustrated previously);

d & e are independently selected from the integral values ranging from 0 to 3 inclusive;

a, b, c & f are independently selected from the integral values ranging from 0 to 2 inclusive;

o, p & n are equal to 1;

m, q & r are independently selected from the integral values ranging from 0 to 1 inclusive;

A, B, D, E and F are covalent bonds sufficient to satisfy the available bonding sites of adjacent carbon atoms, if such carbon atoms are present;

said blowing agent having a boiling point between approximately 5-50° C., and an ozone depletion potential of not greater than 0.05;

said foam system having a reaction profile gel and tack time which is less than approximately 90 seconds, more preferably less than approximately 60 seconds, most preferably less than approximately 45 seconds; and in a preferred embodiment, said blowing agent is non-flammable, recognizing that co-blowing agents may be flammable.

In a preferred embodiment, the blowing agent is a carbon-based moiety with defined fluorine atoms bonded to the carbon backbone. The boiling point of the blowing agent will be as defined previously as well as the vapor pressure.

The above "B" side (50-75% polyols) was mixed with an "A" side (90-95% PMDI) having an average functionality of 2.7, in an approximately 50/50 ratio with an appropriate amount of propellant HFC-245fa necessary to bring the total of each side to 100%.

Contrary to this more conventional wisdom, the technology described in this application uses low pressure blowing agents and froth polyurethane or froth polyisocyanurate foams.

At least in part, the success of the formulation capitalizes on the replacement of the HFC blowing agent HFC-134a (1,1,1,2 tetrafluoroethane) having a low boiling point of ~15.3° F., with the higher boiling point HFC-245fa (1,1,1,3,3 pentafluoropentane) having a boiling point of 59.5° F. in a low pressure closed cell froth polyurethane foam formulation. It is believed that this replacement in blowing agents is one of the factors that led to the success of the invention, namely heightened flow and void filling of the cavity.

Also, at least in part, the addition of a low molecular weight amine-based triol was valuable in the formulation. The low molecular weight (281) amine-initiated triol, which is traditionally used as a chain extended for coatings and as a hardener for elastomers, was needed to increase the foam's crosslink density and thus, counteract the plasticizing effect of the HFC-245fa, which negatively impacts dimensional stability. Minimizing the concentration of HFC-245fa on both the "A" and "B" sides of the formulation, in combination with the above triol allowed the closed cell cured foam to be dimensionally stable. The combination give a resultant cured foam with a parallel compressive strength in excess of 25 psi, indicating a strong structure. The reactive tetrabromophthalate polyol also added to the dimensional stability and compressive strength.

Further, the incorporation of a polysiloxane surfactant assisted in securing a rigid closed-cell polyurethane foam with a closed cell content in excess of 90%. Experimental testing using other polysiloxane surfactants with differing water solubility: water-emulsifiable (B-8499); water-soluble (B-8465); water-miscible (B-8474); and water-insoluble (B-8484) showed differing percent closed cell content on a 1:1 weight substitution. The respective closed cell content was: B-8499 (87.7%); B-8465 (73.2%); B-8474 (79.4%); and B-8484 (83.5%). Using B-8499 in the final formulation produced a resultant cured foam with a closed cell content of 93.3%. This high level of closed cell content in turn, positively impacts the R-value of the foam (6.41° F.-hr-ft²/BTU-in).

This invention is applicable to either PIR or PUR foamed polymers, and in one embodiment, is directed toward the application of the froth foams prepared therefrom to insulate into the exterior wall cavities, although it should be understood that the invention is not limited to exterior wall cavities, but rather any cavity which is desired to be filled with a foamed material, typically requires only one filling hole, preferably at the top of the cavity. This results in labor costs over the use of multiple holes. By employing at least one low pressure blowing agent, the foam flows evenly around obstacles (e.g., pipes, cross members, electrical boxes) leaving minimal or no voids. The foam is of uniform density from the top to the bottom of the cavity, with minimal to no densification.

The use of a froth foam minimizes or prevents seepage of the foam prepolymer at the bottom of the wall cavity. The foam is typically dispensed from cylinders and is pre-expanded with a low vapor pressure HFC blowing agent, preferably 245fa (1,1,1,3,3 pentafluoropentane) as well as FEA-1100, HFC-365mfc, HBA-2, AFA-L1, AFA-L2, including miscible blends and azeotropes thereof. The foam is dispensed through a static mixer which ensures that the "A" and "B" sides react and polymerize sufficiently upon dispensing to create sufficient molecular weight build and thus "froth".

This application utilizes a low pressure blowing agent in a decidedly new manner. Polyurethane froth foam is traditionally blown with a high vapor pressure blowing agent, i.e., HFC-134a (1,1,1,2 tetrafluoroethane) which has a vapor pressure of 82 psig at 25° C., to ensure dispensing all of the cylinder's contents. It was counterintuitive that using a high percentage of a low vapor pressure foam, such as HFC-245fa (1,1,1,3,3 pentafluoropentane) having a vapor pressure of 17.8 psig at 20° C. would dispense properly from pressurized cylinders.

The application uses HFC-245fa, FEA-1100, HFC-365mfc, HBA-2, AFA-L1, AFA-L2, including miscible blends and azeotropes thereof, in an effective amount as a blowing agent component, with some nitrogen to top off the froth foam cylinders to better enable complete dispensing achieves mold cavity filling characteristics which are not traditionally experienced with high pressure impingement foaming applications. The application may optionally employ a co-blowing agent, e.g., water, to reduce the density of the foam and to help open cells (thereby relieving pressure) during cure via the formation of polyurea segments. It is believed that the combination of water with methylene diphenyldiisocyanate form polyurea structures, which disrupt cell formation, thereby assisting in achieving a high open cell content. The blowing agent can be a blend of blowing agents or an azeotrope thereof. When used as a blend, an effective amount of a blowing agent having the characteristics of higher boiling point and lower vapor pressure is required.

In one aspect of the invention, the conclusion that it was possible to substitute a higher boiling point blowing agent at a 1:1 substitution level for a lower boiling point blowing agent, is quite surprising. Without being held to any one theory of operation, the use of nitrogen-pressurized cylinders (other non-reactive gases could be employed) is believed to be at least one aspect of this invention. What is equally counterintuitive is the recognition that the cure profile for a low vapor pressure blowing agent foam system and the cure profile for a higher vapor pressure blowing agent foam system could be essentially similar, yet effective.

The foam of the invention dispenses from relatively inexpensive pressurized, but considered low-pressure (130-225 psi) cylinders rather than high pressure dispensing equipment (>1,000 psi as typically used in impingement mixing) of the prior art. The use of cylinder dispensed polyurethane foam does not have upfront capital costs for equipment as would be necessary with high pressure dispensed polyurethane foam, which is in the order of $30,000 to $100,000 for the special handling equipment required, including proportioning units and spray guns.

The polymerization and foaming reaction is purposely delayed to allow for the dispensation of the liquid A & B components far enough into the cavity to be effective. Excessive molecular weight build, attributed to premature foaming reactions, negatively impact the ability of rising foams to flow efficiently through complicated geometrical cavities. Thus, the formulation is designed in such a way that the beginning of the foaming reaction is delayed for at least 10-15 seconds after dispensation from the static mixer portion of a foam dispensing tool, allowing the chemicals to reach the furthermost end of the cavity before the foaming reaction begins. The formula is designed in such a manner that once the foaming reaction begins, it flows rapidly through complicated geometries, curing (polymerization) enough to impede flow only when the foam has traveled a significant distance. The above is achieved by the ratio of "B" side polyols in combination with surfactants and catalysts and water.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A process for filling a cavity with a frothable polyurethane or a polyisocyanurate pour-in-place foam system, said process comprising the step of:

adding a two-component polyurethane or polyisocyanurate uncured foam to said cavity, said two-component polyurethane or polyisocyanurate curing into a cured foam, each of said two components used to make the cured foam comprising an effective amount of at least one blowing agent, including miscible blends and azeotropes thereof, said blowing agent comprising formula (I):

$$[CV_a]_m\text{-}A\text{-}[CX_b]_n\text{—}B\text{—}[CY_c]_o\text{-}D\text{-}[CZ_d]_p$$

wherein

C is a carbon atom;

V, X, Y and Z are independently selected from the group consisting of H, F and Cl;

a & d are independently selected from the integral values ranging from 0 to 3 inclusive;

b & c are independently selected from the integral values ranging from 0 to 2 inclusive;

o, p & n are equal to 1;

m is selected from the integral values ranging from 0 to 1 inclusive;

A, B and D are covalent bonds sufficient to satisfy the available bonding sites of adjacent carbon atoms, if such carbon atoms are present;

said at least one blowing agent having a boiling point between approximately 5-50° C., and an ozone depletion potential of not greater than 0.05;

a first component comprising a B-side blend which comprises at least:

a polyol blend having an average hydroxyl number of approximately 350 or greater, said polyol blend comprising;

25-45 wt % of the B-side blend of an oxypropylated aliphatic amine polyether polyol having an average functionality of 3;

5-15 wt % of the B-side blend of a sucrose glycerine propoxylated polyether polyol having an average functionality of between about 4.5-5.0;

5-15 wt % of the B-side blend of a phthalic acid aromatic polyester polyol having an average functionality of about 2.2;

2-15 wt % of the B-side blend of a halogenated phthalate diol having an average functionality of 2;

said B-side blend containing 50-75 wt % polyols comprising at least the oxypropylated aliphatic amine polyether polyol, the sucrose glycerine propoxylated polyether polyol, the phthalic acid aromatic polyester polyol and the halogenated phthalate diol;

1-5 wt % of a water-emulsifiable polysiloxane surfactant in the B-side blend;

a second component comprising at least one A-side diisocyanate;
a pressure differential between said A-side and said B-side of less than or equal to 30 psig and an A-side/B-side weight ratio approximately equal to or greater than 1.0;
said cured foam having a closed cell content of at least 90%;
the cured foam having a parallel compressive strength in excess of 25 psi;
a reaction of said B-side blend and said A-side diisocyanate delayed for at least 10 seconds after dispensing from a mixer affixed to a foam-dispensing tool.

2. The process of claim 1 wherein
said covalent bonds A, B and D are independently selected from the group consisting of single, double and triple covalent bonds.

3. The process of claim 1 wherein formula (I) is selected from the group consisting of
1,1,1,3,3-pentafluoropropane, 1,1,1,3,3-pentafluorobutane, 1,1,1,4,4,4-hexafluoro-2-butene, trans-3,3,3-trifluoro-1-chloro-propene, miscible blends and azeotropes thereof and further wherein formula (I) is a major amount of said blowing agent.

4. The process of claim 3 wherein said blowing agent has a boiling point between approximately 10-40° C.

5. The process of claim 4 wherein a vapor pressure of said blowing agent is
approximately 5 psi (34.5 kPa) to 30 psi (206.9 kPa) at 75° F. (24° C.).

6. The process of claim 1 which further comprises the step of:
monitoring a temperature exotherm of said polymerization to determine if said cavity is being completely filled.

7. The process of claim 6 wherein said step of monitoring is by
an Infrared camera.

8. The process of claim 6 which further comprises the step of:
drilling a hole beneath an obstruction as determined by monitoring said temperature exotherm.

9. The process of claim 7 which further comprises the step of:
adding additional foam into said hole beneath said obstruction to completely fill said cavity.

10. The process of claim 1 wherein
said halogenated phthalate diol comprises at least approximately 30% bromine.

11. The process of claim 1 wherein
said foam system has a reaction profile gel and tack time which is less than approximately 90 seconds.

12. The process of claim 11 wherein
said reaction profile gel and tack time is less than approximately 60 seconds.

13. The process of claim 12 wherein
said reaction profile gel and tack time is less than approximately 45 seconds.

14. A process for filling a cavity with a frothable two-component polyurethane or a polyisocyanurate pour-in-place foam system, said frothable polyurethane or frothable polyisocyanurate curing into a cured foam, said process comprising the steps of:
adding the two-component uncured polyurethane or polyisocyanurate foam to said cavity, each of said two components used to make the cured foam comprising an effective amount of at least one blowing agent, including miscible blends and azeotropes thereof, said blowing agent comprising formula (II):

$[CU_e]_q\text{-E-}[CW_f]_r\text{—F—}[CV_a]_m\text{-A-}[CX_b]_n\text{—B—}[CY_c]_o\text{-D-}[CZ_d]_p$ wherein
C is a carbon atom;
U, W, V, X, Y and Z are independently selected from the group consisting of H, F and Cl;
d & e are independently selected from the integral values ranging from 0 to 3 inclusive;
a, b, c & f are independently selected from the integral values ranging from 0 to 2 inclusive;
o, p & n are equal to 1;
m, q & r are independently selected from the integral values ranging from 0 to 1 inclusive;
A, B, D, E and F are covalent bonds sufficient to satisfy the available bonding sites of adjacent carbon atoms, if such carbon atoms are present;
said blowing agent having a boiling point between approximately 5-50° C., and an ozone depletion potential of not greater than 0.05;
a first component comprising a B-side blend which comprises at least:
a polyol blend having an average hydroxyl number of approximately 350 or greater, said polyol blend comprising;
25-45 wt % of the B-side blend of an oxypropylated aliphatic amine polyether polyol having an average functionality of 3;
5-15 wt % of the B-side blend of a sucrose glycerine propoxylated polyether polyol having an average functionality of between about 4.5-5.0;
5-15 wt % of the B-side blend of a phthalic acid aromatic polyester polyol having an average functionality of about 2.2;
2-15 wt % of the B-side blend of a halogenated phthalate diol having an average functionality of 2;
said B-side blend containing 50-75 wt % polyols comprising at least the oxypropylated aliphatic amine polyether polyol, the sucrose glycerine propoxylated polyether polyol, the phthalic acid aromatic polyester polyol and the halogenated phthalate diol;
1-5 wt % of the B-side of a water-emulsifiable polysiloxane surfactant;
a second component comprising at least one A-side diisocyanate;
a pressure differential between said A-side and said B-side of less than or equal to 30 psig and an A-side/B-side weight ratio approximately equal to or greater than 1.0;
said cured foam having a closed cell content of at least 90%;
the cured foam having a parallel compressive strength in excess of 25 psi;
a reaction of said B-side blend and said A-side diisocyanate delayed for at least 10 seconds after dispensing from a mixer affixed to a foam-dispensing tool.

15. The process of claim 14 wherein
said covalent bonds A, B and D are independently selected from the group consisting of single, double and triple covalent bonds.

16. The process of claim 14 wherein formula (I) is selected from the group consisting of
1,1,1,3,3-pentafluoropropane, 1,1,1,3,3-pentafluorobutane, 1,1,1,4,4,4-hexafluoro-2-butene, trans-3,3,3-trifluoro-1-chloro-propene, miscible blends and azeotropes thereof and further wherein formula (I) is a major amount of said blowing agent.

17. The process of claim 16 wherein said blowing agent has a boiling point between approximately 10-40° C.

18. The process of claim 17 wherein a vapor pressure of said blowing agent is
approximately 5 psi (34.5 kPa) to 30 psi (206.9 kPa) at 75° F. (24° C.).

19. The process of claim 14 which further comprises the step of:
monitoring a temperature exotherm of said polymerization to determine if said cavity is being completely filled.

20. The process of claim 19 wherein said step of monitoring is by
an Infrared camera.

21. The process of claim 19 which further comprises the step of:
drilling a hole beneath an obstruction as determined by monitoring said temperature exotherm.

22. The process of claim 21 which further comprises the step of:
adding additional foam into said hole beneath said obstruction to completely fill said cavity.

23. The process of claim 14 wherein
said covalent bonds A, B, D, E and F are independently selected from the group consisting of single, double and triple covalent bonds.

24. The process of claim 14 wherein formula (II) is selected from the group consisting of
1,1,1,3,3-pentafluoropropane, 1,1,1,3,3-pentafluorobutane, 1,1,1,4,4,4-hexafluoro-2-butene, 3,3,3-trifluoro-1-chloro-propene, miscible blends and azeotropes thereof and further wherein formula (II) is a major amount of said blowing agent.

25. The process of claim 14 wherein
said halogenated phthalate diol comprises at least approximately 30% bromine.

26. The process of claim 14 wherein
said foam system has a reaction profile gel and tack time which is less than approximately 90 seconds.

27. The process of claim 26 wherein
said reaction profile gel and tack time is less than approximately 60 seconds.

28. The process of claim 27 wherein
said reaction profile gel and tack time is less than approximately 45 seconds.

\* \* \* \* \*